United States Patent Office
3,839,586
Patented Oct. 1, 1974

3,839,586
MOSQUITO CONTROL EMPLOYING CERTAIN
2,6-DISUBSTITUTED PHENOLS
George F. Ludvik, Mountain View, Calif., assignor to
Monsanto Company, St. Louis, Mo.
No Drawing. Continuation-in-part of abandoned application Ser. No. 42,516, June 1, 1970. This application Aug. 28, 1972, Ser. No. 283,996
Int. Cl. A01n 9/12, 9/26
U.S. Cl. 424—337      12 Claims

ABSTRACT OF THE DISCLOSURE

Method of preventing mosquito larvae from developing into the adult stage by exposing the mosquito larvae to a 2,6-disubstituted phenol, preferably a 2,6-di-tertiary butylphenol, having hydrogen, an isopropylphenyl, alkyl, alkoxy or a thioalkyl group in the four-ring position.

---

This application is a continuation-in-part of copending application Ser. No. 42,516 filed June 1, 1970, entitled "Mosquito Control" now abandoned.

This invention relates to methods for the control of mosquitoes and particularly to methods for the disruption or interruption of the life cycle of mosquitoes by contacting mosquito larvae with, or exposing them to, an effective amount of a compound of the formula

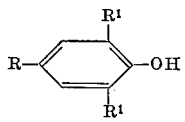

wherein R is hydrogen, isopropylphenyl, or alkyl, alkoxy or thioalkyl having a maximum of 6 carbon atoms and $R^1$ is tertiary butyl, tertiary pentyl or cyclohexyl. The preferred compounds of this group are those in which $R^1$ is tertiary butyl.

Previously known methods for mosquito control have traditionally centered on the use of insecticides or larvicides and more recently on insect chemosterilants. These past efforts have met with only a modicum of success, and the results have been sporadic, temporary, and local. In accordance with this invention, it has now been found that mosquitoes, i.e. members of the insect family Culicidae, can be readily and effectively controlled by subjecting mosquito larvae, or their habitat, to an effective amount of one or more compounds of the present invention. Generally, these compounds have no immediate effect upon the larvae, and do not interfere with the actual transformation to the pupal stage. The resultant pupae, however, remain white, fail to develop normally, and die before the emergence of adult mosquitoes. These compounds are therefore not larvicidal in their activity, but their effectiveness is dependent upon a novel biological response. The compounds of this invention are particularly effective against members of the genera Aedes, such as the yellow fever mosquito, Aedes aegypti; Anopheles, such as the malaria mosquito, Anopheles quadrimaculatus; and Culex, such as the house mosquito, Culex pipiens, as well as those of the genera Culiseta, Deinocerites, Haemagogus, Mansonia, Megarhinus, Orthopodomyia, Psorophora, Sabethes, Toxorhynchites, Uranotaenia, and Wyeomia.

The compounds of the present invention can be readily prepared by known methods. For example, 2,6-di-tertiary butyl-4-cumylphenol,

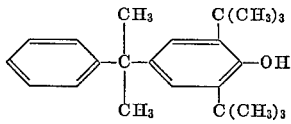

is prepared by the direct alkylation of p-cumylphenol,

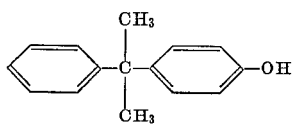

with isobutylene in an acidic medium, followed by neutralization. The alkoxy and thoalkyl compounds are most conveniently prepared by halogenating 2,6 - di - tertiary-butylphenol in the para position, and reacting the resultant halophenol with a mercaptan or an alcohol in the presence of triethylamine. The 2,6-di-tertiary-pentyl- and the 2,6-dicyclohexyl substituted compounds can be prepared in like manner as illustrated by the following equations:

(a)
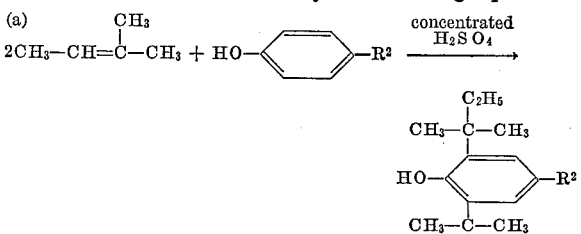

(b)

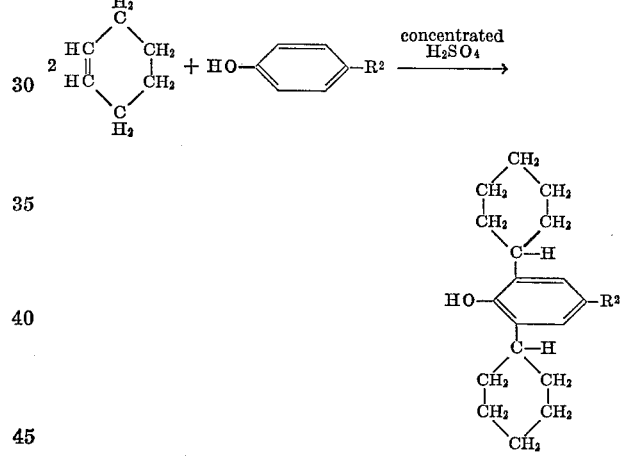

In the above equations, (a) and (b), $R^2$ is selected from the group consisting of hydrogen, —H
isopropylphenyl (alpha-alpha-dimethylbenzyl)

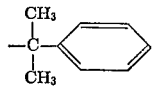

and
alkyl of 1 to 6 carbons, —$R^3$ (c)
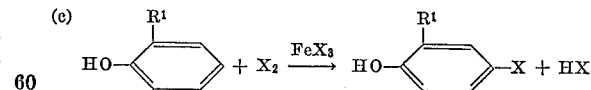

(d)

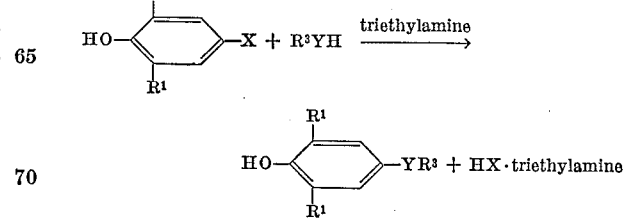

In the above equations, (c) and (d), $R^1$ and $R^3$ are as defined hereinbefore, X is halogen and Y is sulfur or oxygen.

Compounds under consideration include:

2,6-di-tertiary butylphenol
2,6-di-tertiary pentylphenol
2,6-di-tertiary butyl-4-thioamylphenol
2,6-di-tertiary butyl-4-thiohexylphenol
2,6-di-tertiary butyl-4-thiobutylphenol
2,6-di-tertiary butyl-4-thiopropylphenol
2,6-di-tertiary butyl-4-thioethylphenol
2,6-di-tertiary butyl-4-thiomethylphenol
2,6-di-tertiary pentyl-4-thiohexylphenol
2,6-di-tertiary pentyl-4-thiomethylphenol
2,6-di-tertiary butyl-4-hexoxyphenol
2,6-di-tertiary butyl-4-pentoxyphenol
2,6-di-tertiary butyl-4-butoxyphenol
2,6-di-tertiary butyl-4-propoxyphenol
2,6-di-tertiary butyl-4-ethoxyphenol
2,6-di-tertiary butyl-4-methoxyphenol
2,6-di-tertiary pentyl-4-methoxyphenol
2,6-di-tertiary pentyl-4-hexoxyphenol
2,6-di-tertiary butyl-4-cumylphenol
2,6-di-tertiary butyl-4-methylphenol
2,6-di-tertiary butyl-4-ethylphenol
2,6-di-tertiary butyl-4-propylphenol
2,6-di-tertiary butyl-4-pentylphenol
2,6-di-tertiary butyl-4-hexylphenol
2,4,6-tri-tertiary butylphenol
2,6-di-tertiary pentyl-4-cumylphenol
2,6-dicyclohexylphenol
2,6-dicyclohexyl-4-thiohexylphenol
2,6-dicyclohexyl-4-thiomethylphenol
2,6-dicyclohexyl-4-methoxyphenol
2,6-dicyclohexyl-4-hexoxyphenol
2,6-dicyclohexyl-4-cumylphenol and the like.

The larvae of the mosquito to be controlled have a water habitat and therefore the compound of this invention can be added per se to the water, formulated with a solid carrier and cast upon the surface of the water, or sprayed upon the water in the form of a solution or liquid dispersion, provided the amount applied is an effective amount.

Although the compounds of this invention are useful per se in controlling mosquitoes, it is preferable that they be applied directly to the mosquito larvae and/or their habitat in a dispersed form in a suitable extending agent. The suitable extending agents for liquid formulations include organic solvents such as acetone, methyl ethyl ketone, dioxane, heptane and the like higher liquid alkanes and petroleum fractions boiling under 400° F. and having a flash point above about 80° F. When solid formulations are desired, the extending agents that can be used include tricalcium phosphate, calcium carbonate, diatomaceous earth, talc, wood flour and the like, which are preferably reduced to a particle size of about 5 microns or less. In most instances, it is preferred to use a surface active agent to facilitate dispersion of the active compounds throughout the aqueous habitat of the mosquito larvae. The compounds of the present invention can be used alone or in combination with other pesticidal agents to broaden the spectrum of activity obtained with a single application. The concentration of the compounds of this invention in such formulations can vary from about 5 to about 98% by weight of the composition and the compositions are usually applied to the aqueous habitat in sufficient quantity to provide a concentration between about 0.01 and about 5 p.p.m.

The value of the compounds under consideration is greatly enhanced by their specificity of action, their exceedingly low mammalian toxicity and their lack of toxicity toward fish. For example, 2,6-di-tertiary butyl-4-cumylphenol, when fed orally to rats, had a $LD_{50}$ of 1,890 mg./kg., and when applied dermally to rabbits exhibited a MLD greater than 3,160 mg./kg. In addition, the same compound has no effect whatsoever on guppies at a concentration of 10 p.p.m. over a period of 48 hours.

The unusual activity of the compounds of the present invention is illustrated by the following:

A base solution of the compound to be evaluated is prepared by dissolving 1.0 gram thereof in sufficient acetone to provide a 0.10% by weight solution thereof. Then 0.10 ml. of this acetone solution is pipetted into a 25 x 200 mm. culture tube containing sufficient distilled water to provide concentrations of 2 p.p.m. and 0.2 p.p.m. of the compound to be evaluated. The tube is stoppered and shaken vigorously to facilitate complete mixing of its contents. Thereupon approximately 25 early instar yellow fever mosquito larvae (*Aedes aegypti*) are transferred to the tube with the aid of a pipette. The larvae are then held in the tube at 25° C. for seven days, at the end of which time mortality observations are taken. The results in percent kill of the resultant pupae are concentrations of 2 p.p.m. and 0.2 p.p.m. obtained are set forth below:

| | 2.0 p.p.m. | 0.2 p.p.m. |
|---|---|---|
| Compound, percent: | | |
| 2,6-di-tertiary butyl-4-thiobutylphenol | 100 | 0 |
| 2,6-di-tertiary butyl-4-thiomethylphenol | 80 | 0 |
| 2,6-di-tertiary butylphenol | 90 | 0 |
| 2,6-di-tertiary butyl-4-cumylphenol | 100 | 100 |
| 2,6-di-tertiary pentylphenol | 90 | 0 |
| 2,6-di-cyclohexylphenol | 100 | 0 |
| 2,6-di-cyclohexyl-4-methylphenol | 100 | 0 |

By contrast, analogous compounds such as 2,6-di-isoamylphenol, 2,6-di-tertiary butyl-4-chlorophenol and 2,6-di-(1-methylnonyl)phenol exhibited no activity when the test procedure described above was repeated, using these compounds instead of the compounds of the present invention.

While this invention has been described with respect to certain embodiments it is to be understood that it is not so limited, and that variations and modifications thereof obvious to those skilled in the art can be made without departing from the spirit or scope thereof.

What is claimed is:

1. A method of preventing the development of mosquitoes from the larval stage to the adult stage which comprises contacting mosquito larvae with an amount, effective to prevent the development of said mosquitoes, of a compound of the formula

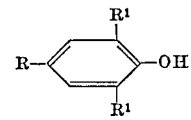

wherein R is selected from the group consisting of hydrogen, isopropylphenyl, alkyl of from 1 to 6 carbons, alkoxy of from 1 to 6 carbons, and thioalkyl of from 1 to 6 carbons and $R^1$ is selected from the group consisting of tertiary butyl, tertiary pentyl and cyclohexyl.

2. The method of Claim 1 in which $R^1$ is tertiary butyl.

3. The method of Claim 2 in which the compound is 2,6-di-tertiary butyl-4-thiobutylphenol.

4. The method of Claim 2 in which the compound is 2,6-di-tertiary butyl-4-thiomethylphenol.

5. The method of Claim 2 in which the compound is 2,6-di-tertiary butylphenol.

6. The method of Claim 2 in which the compound is 2,6-di-tertiary butyl-4-cumylphenol.

7. The method of Claim 1 wherein $R^1$ is tertiary pentyl.

8. The method of Claim 7 wherein the compound is 2,6-di-tertiary pentylphenol.

9. The method of Claim 1 wherein $R^1$ is cyclohexyl.

10. The method of Claim 9 wherein the compound is 2,6-dicyclohexylphenol.

11. The method of Claim 9 wherein the compound is 2,6-dicyclohexyl-4-methylphenol.

12. The method of Claim 1 wherein R is isopropylphenyl.

References Cited

UNITED STATES PATENTS 3,538,226  11/1970  Ozaki et al. -------- 424—304
3,535,424  10/1970  Fujimoto et al. ------ 424—304

OTHER REFERENCES

Borkovec, A., "Insect Chemosterilants" vol. VII (1966), pp. 61–63.

VINCENT D. TURNER, Primary Examiner

U.S. Cl. X.R.

424—341, 346, Dig. 12